United States Patent [19]

Dwyer

[11] 4,247,092

[45] Jan. 27, 1981

[54] APPARATUS FOR HANDLING A PLURALITY OF SIGNATURE BUNDLES

[75] Inventor: Robert E. Dwyer, Madison Heights, Mich.

[73] Assignee: D. W. Zimmerman Mfg., Inc., Madison Heights, Mich.

[21] Appl. No.: 44,562

[22] Filed: Jun. 1, 1979

[51] Int. Cl.³ .......................... B65H 39/02; B23Q 3/08
[52] U.S. Cl. ...................................... 270/54; 269/26; 269/35
[58] Field of Search ........................... 270/54; 281/45; 282/29 R; 269/20, 24–26, 35; 248/309 R, 313, 316 R, 316 D

[56] References Cited

U.S. PATENT DOCUMENTS

| | | | |
|---|---|---|---|
| 2,668,704 | 2/1954 | Durksen | 270/54 |
| 3,438,622 | 4/1969 | Laschewski | 270/54 X |
| 3,700,227 | 10/1972 | Sessody | 269/35 X |
| 3,973,764 | 8/1976 | Holzer, Jr. | 269/26 |

Primary Examiner—E. H. Eickholt
Attorney, Agent, or Firm—Allen D. Gutchess, Jr.

[57] ABSTRACT

Apparatus is provided for handling signature bundles. The apparatus is specifically designed to handle at least two signature bundles at once, including ones of different lengths. The apparatus includes a generally C-shaped frame with legs and a connecting frame member. One of the legs has a fluid-operated cylinder mounted thereon with a piston rod extending toward the other leg. A pivotable bar has an intermediate portion connected to an outer end of the piston rod and two clamping pads are pivotally connected to outer end portions of said pivotable bar. This arrangement enables the clamping pads to simultaneously clamp two signature bundles of different lengths between themselves and the other leg when the piston rod is moved toward the other leg. The apparatus is carried by a hoist bar having a hoist loop connected to a hoist by means of which the bundles can be raised and lowered as well as being moved about. The end of the connecting bar opposite the hoist loop is pivotally connected to an intermediate portion of the connecting frame member so that the frame can be pivoted on a horizontal axis about the connecting bar so as to move the signature bundles between horizontal and vertical positions, as desired.

10 Claims, 5 Drawing Figures

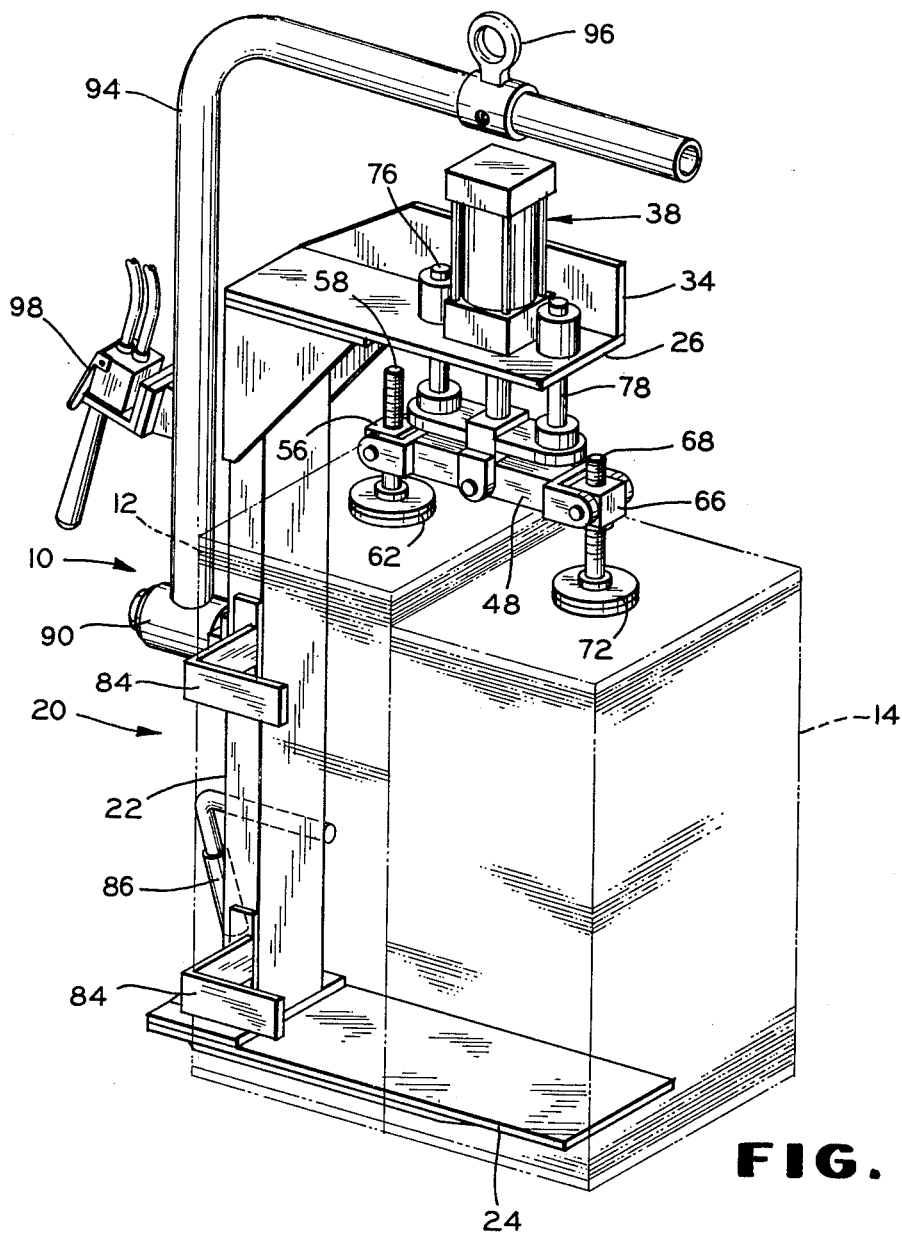
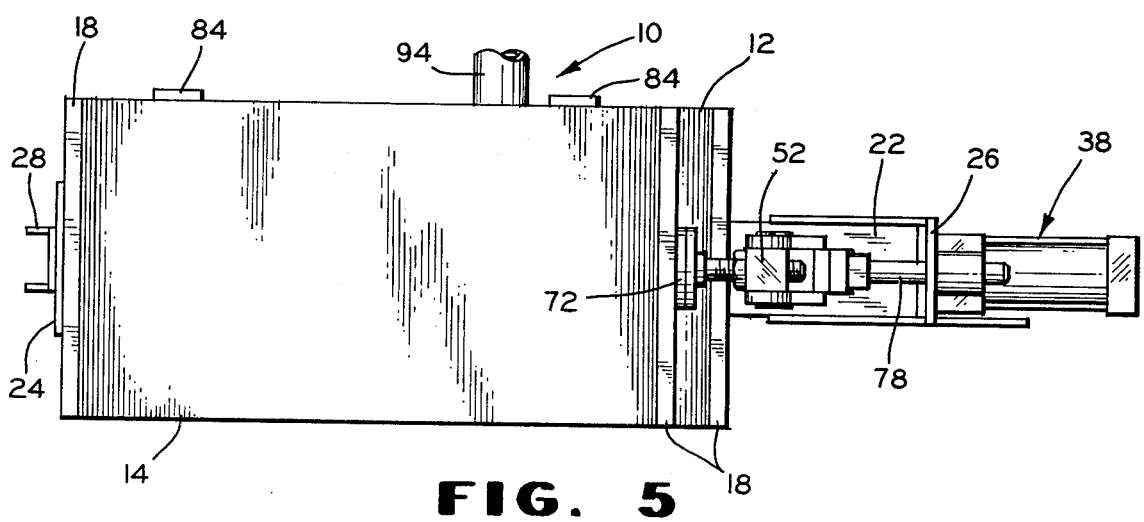

APPARATUS FOR HANDLING A PLURALITY OF SIGNATURE BUNDLES

This invention relates to apparatus for handling a plurality of signature bundles and includes clamping means for clamping bundles of different lengths.

In the printing and graphic arts industries, apparatus is employed to clamp and lift bundles of signatures and transport them between various locations. For example, the bundles are required to be moved from stacking equipment which stacks the signatures in bundles to feeding equipment which separates and collates the bundles with other bundles. It is frequently desirable to handle two signature bundles at one time to save time and labor, and the signature bundles are often of different lengths. It is also sometimes desired to reposition the bundles from horizontal to vertical positions.

The present invention provides signature handling apparatus which can clamp and carry at least two signature bundles at once, even if the overall bundles are of different lengths. To accomplish this, the apparatus includes a generally C-shaped frame having two legs and a connecting frame member. One of the legs has a fluid-operated cylinder mounted thereon and positioned with its piston rod extending toward the other leg. A pivotable bar is pivotally connected at an intermediate portion to the outer end of the piston rod and two spaced clamping pads are pivotally connected to spaced portions of said pivotable bar. When the piston rod is moved toward the other leg, it then clamps ends of the signature bundles between the pads and the other leg even though the bundles are of different lengths. A pair of guide rods can also be carried by the one leg to stabilize the piston rod.

The apparatus is carried by an overhead hoist and for this purpose has a hoist bar with a hoist hook loop fastened to a hoist hook. This hoist bar is pivotally mounted at an intermediate portion of the connecting frame member of the overall frame so that bundles carried by the apparatus can be repositioned about a horizontal axis between horizontal and vertical positions, as desired.

It is, therefore, a principal object of the invention to provide apparatus for handling a plurality of signature bundles at one time.

Another object of the invention is to provide apparatus for handling signature bundles and changing them from horizontal to vertical positions or other positions, as desired.

Many other objects and advantages of the invention will be apparent from the following detailed description of a preferred embodiment thereof, reference being made to the accompanying drawings, in which:

FIG. 1 is a view in perspective of apparatus embodying the invention shown engaging two signature bundles;

FIG. 5 is a front view in elevation of the apparatus of FIGS. 1 and 2 shown in a different position.

Figure 2:
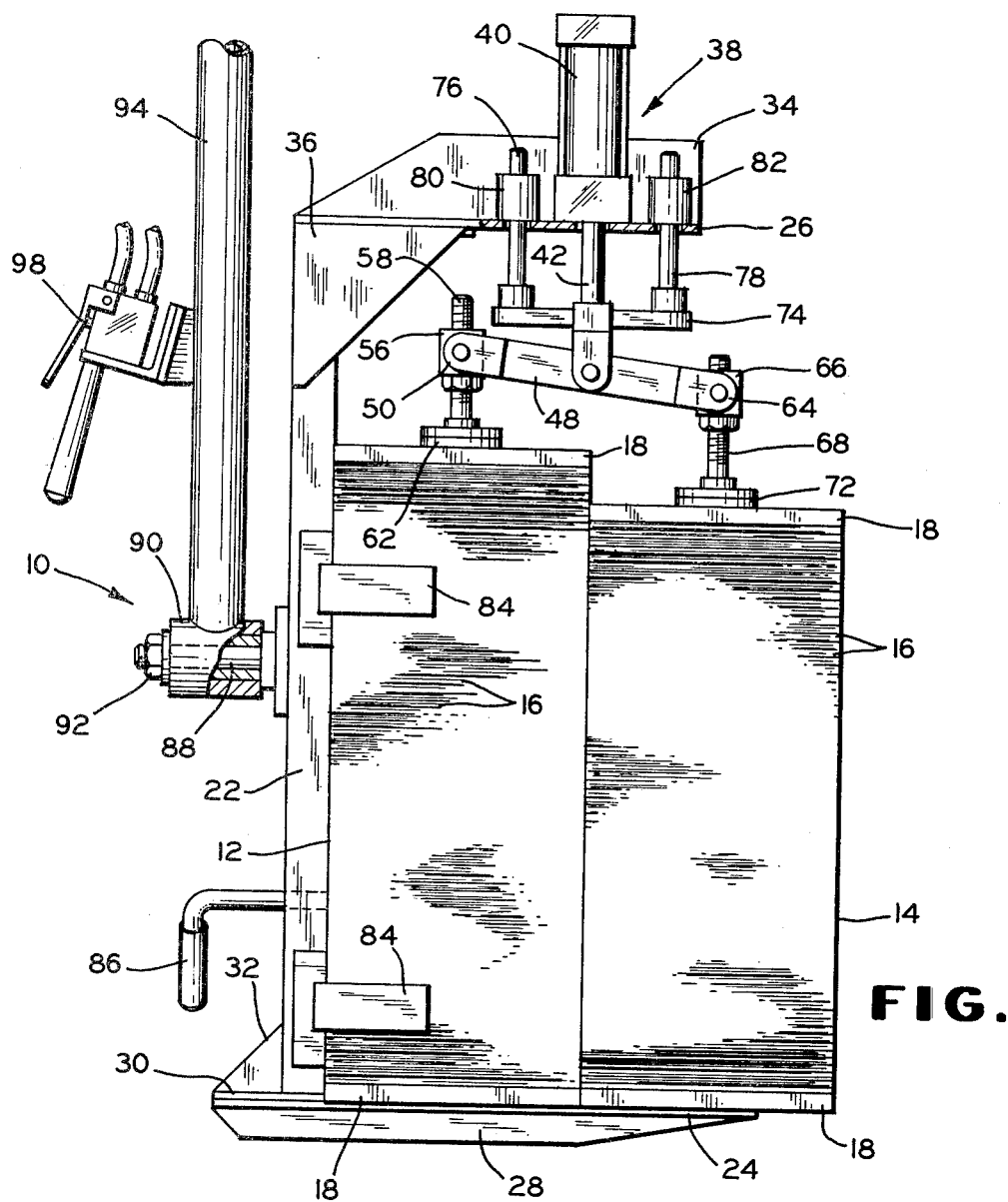
FIG. 2 is a side view in elevation of the apparatus of FIG. 1, with parts broken away and with parts in section.

Referring to the drawings, signature bundle-handling apparatus is indicated at 10 and is shown engaging two signature bundles 12 and 14, each of which includes a multiplicity of signatures 16 and end plates 18. All of the signatures have their folded edges commonly oriented.

The apparatus 10 includes a generally C-shaped frame indicated at 20 which includes a connecting frame member 22 and stationary legs 24 and 26. The leg 24 has a stiffening flange 28 with an end plate 30 and brace plates 32 affixed to an end of the connecting member 22. The stationary leg 26 has a side flange 34 and is affixed to the other end of the connecting member 20 by brace plates 36.

Figures 3, 4:
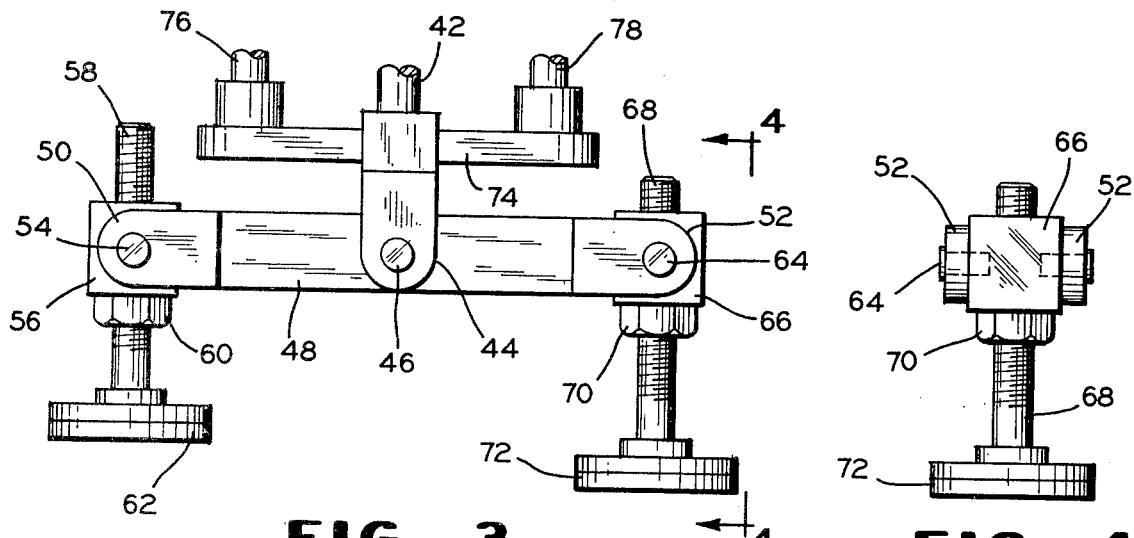
FIG. 3 is a fragmentary, enlarged view in elevation of a portion of the apparatus of FIGS. 1 and 2.
FIG. 4 is a end view in elevation taken along the line 4—4 of FIG. 3.

The stationary leg 26 has a fluid-operated ram 38 mounted thereon with a cylinder 40 and a piston rod 42 extending through the leg 26 toward the other stationary leg 24. The rod 42 has a clevis 44 (FIG. 3) affixed to the end thereof with a pivot pin 46 pivotally connecting the clevis to an intermediate portion of a pivotable elongate member or bar 48. The bar 48 terminates in ears 50 at one end and ears 52 at the other end. The ears 50 have pivot pins 54 pivotally connecting the ears to a threaded block 56. A threaded shank 58 is turned through the block 56 and held in a desired position by a lock nut 60. The shank 58 terminates in a clamping pad 62. Similarly, the ears 52 have pins 64 pivotally connecting the ears to a threaded block 66 through which is turned a threaded shank 68 which is held in a desired position by a lock nut 70. The shank 68 terminates in a clamping pad 72.

To provide stability for the piston rod 42, a stabilizing bar 74 extends beyond both sides of the clevis 44 and has guide rods 76 and 78 extending therefrom parallel to the piston rod 42. The rods 76 and 78 extend through bearing blocks 80 and 82 which are mounted on the stationary leg 26.

With this arrangement, the two signature bundles 12 and 14 can thus be handled together to save considerable time and labor with the pivotable clamping pads 62 and 72 enabling the apparatus 10 to readily accommodate signature bundles of different lengths.

The connecting member 22 has two locating arms 84 extending therefrom to aid in positioning the bundles 12 and 14 relative to the end legs 24 and 26. The connecting frame member 22 also has a handle 86 by means of which the connecting member can be manipulated and positioned. An axle 88 is suitably affixed to an intermediate portion of the connecting member 22 and extends in a direction opposite the bundles. The axle 88 extends through a bearing block 90 and is threaded to receive a nut 92. The bearing block 90 is affixed to an end of an L-shaped hoist bar 94 having a loop 96 for a hoist hook. A hoist control 98 is also mounted on the hoist bar 94.

With this arrangement, the signture bundles 12 and 14 can be moved between vertical positions, as shown in FIGS. 1 and 2, and horizontal positions, as shown in FIG. 5. The bundles 12 and 14 can be picked up in horizontal positions at the stacking equipment and then moved to the vertical positions at the feeding equipment which separates and collates the bundles with other bundles. Some types of feeding equipment, known as magazine automatic collators, require vertical positioning of the bundles and then feed the signatures from the bottom of the bundles. With the pivotal arrangement of the connecting member 20 and the hoist arm 94, the bundles can be easily moved to the vertical positions.

Various modifications of the above described embodiment of the invention will be apparent to those skilled in the art, and it is to be undestood that such modifications can be made without departing from the scope of the invention, if they are within the spirit and the tenor of the accompanying claims.

I claim:

1. Apparatus for handling a plurality of signature bundles comprising a generally C-shaped frame including two spaced legs and a connecting frame member connected to an end of each of said legs, fluid-operated means carried by one of said legs and having a piston rod extending toward the other of said legs, a pivotable bar pivotally carried by the outer end of said piston rod at an intermediate portion of said bar, two spaced clamping pads, and means pivotally connecting said clamping pads to spaced portions of said bar on either side of said piston rod.

2. Apparatus according to claim 1 characterized by a spaced bearing block mounted on said one leg on each side of said fluid-operated means, a guide bar carried by each of said bearing blocks, and a stabilizing bar affixed to said guide bars and having an intermediate portion affixed to said piston rod.

3. Apparatus according to claim 1 characterized by a hoist bar, and means pivotally connecting a lower end of said hoist bar to an intermediate portion of said connecting frame member to enable said connecting frame member to swing between horizontal and vertical positions.

4. Apparatus according to claim 1 characterized by means for moving said clamping pads toward and away from said spaced portions of said pivotable bar.

5. Apparatus according to claim 4 characterized by said moving means comprising threaded blocks constituting part of said pivotal connecting means and threaded shanks extending from said clamping pads through said threaded blocks.

6. Apparatus for handling signature bundles comprising a generally C-shaped frame including two spaced legs and a connecting frame member connected to an end of each of said legs, a hoist bar for connecting said frame to a hoist hook or the like, and means pivotally connecting a lower end of said hoist bar to an intermediate portion of said connecting frame member to enable said connecting frame member of pivot about a horizontal axis relative to said hoist bar.

7. Apparatus according to claim 6 characterized by fluid-operated means carried by one of said legs and having a piston rod extending toward the other of said legs, a pivotable bar pivotally carried by the outer end of said piston rod at an intermediate portion of said bar, two spaced clamping pads and means pivotally connecting said pads to spaced portions of said pivotable bar on each side of said piston rod.

8. Apparatus according to claim 7 characterized by a spaced bearing block mounted on said one leg on each side of said fluid-operated means, a guide bar carried by each of said bearing blocks, and a stabilizing bar affixed to said guide bars and having an intermediate portion affixed to said piston rod.

9. Apparatus according to claim 7 characterized by means for moving said clamping pads toward and away from said spaced portions of said pivotable bar.

10. Apparatus according to claim 9 characterized by said moving means comprising threaded blocks constituting part of said pivotal connecting means and threaded shanks extending from said clamping pads through said threaded blocks.

* * * * *